United States Patent
Thomason et al.

(10) Patent No.: US 9,489,376 B2
(45) Date of Patent: Nov. 8, 2016

(54) IDENTIFYING CONFIDENTIAL DATA IN A DATA ITEM BY COMPARING THE DATA ITEM TO SIMILAR DATA ITEMS FROM ALTERNATIVE SOURCES

(71) Applicant: International Business Machines Corporation, Armonk, NY (US)

(72) Inventors: Michael Scott Thomason, Raleigh, NC (US); Jai S. Arun, Morrisville, NC (US); Benjamin L. Myers, Durham, NC (US); Chad C. Rotermund, Willamsburg, VA (US); Ajit J. Jariwala, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 13/732,501

(22) Filed: Jan. 2, 2013

(65) Prior Publication Data

US 2014/0188921 A1    Jul. 3, 2014

(51) Int. Cl.
*G06F 17/27* (2006.01)
*G06F 21/62* (2013.01)

(52) U.S. Cl.
CPC ....... *G06F 17/2775* (2013.01); *G06F 21/6245* (2013.01)

(58) Field of Classification Search
None
See application file for complete search history.

(56) References Cited

U.S. PATENT DOCUMENTS

| | | | |
|---|---|---|---|
| 6,324,650 B1 * | 11/2001 | Ogilvie | G06F 21/6209 726/2 |
| 7,885,944 B1 | 2/2011 | Bruening | |
| 7,979,413 B2 * | 7/2011 | Krishnamurthy et al. | ... 707/706 |
| 8,091,138 B2 | 1/2012 | Yellepeddy et al. | |
| 8,127,360 B1 * | 2/2012 | Wilhelm | G06F 21/552 726/25 |
| 8,205,796 B2 * | 6/2012 | Macklin | G06Q 10/06 235/375 |
| 8,688,601 B2 * | 4/2014 | Jaiswal | 706/12 |
| 8,732,821 B1 * | 5/2014 | Spertus | 726/19 |
| 8,881,296 B2 * | 11/2014 | Travis | G06F 21/6263 726/26 |
| 2003/0084333 A1 * | 5/2003 | Archambeault et al. | 713/200 |
| 2004/0193910 A1 * | 9/2004 | Moles | 713/200 |
| 2005/0038788 A1 * | 2/2005 | Dettinger et al. | 707/10 |
| 2005/0197177 A1 | 9/2005 | Charasika | |
| 2006/0005247 A1 * | 1/2006 | Zhang | G06F 17/30616 726/26 |

(Continued)

OTHER PUBLICATIONS

IBM, "Method and Apparatus for Hardcopy Confidential Info Tagging and Detection," IPCOM000181679D, Apr. 9, 2009.

(Continued)

*Primary Examiner* — Hung Le
(74) *Attorney, Agent, or Firm* — Richard A. Wilhelm; David H. Judson

(57) ABSTRACT

A method, apparatus and computer program product to identify confidential information in a document. To examine a document for inclusion of confidential information, the document is compared against documents having similar structure and content from one or more other sources. When comparing documents (of similar structure and content) from different sources, confidential information is then made to stand out by searching for terms (from the sources) that are not shared between or among them. In contrast, common words or terms that are shared across the sources are ignored as likely being non-confidential information; what remains as not shared may then be classified as confidential information and protected accordingly (e.g., by omission, redaction, substitution or the like). Using this technique, non-confidential information may be safely segmented from confidential information in a dynamic, automated manner.

22 Claims, 4 Drawing Sheets

(56) References Cited

U.S. PATENT DOCUMENTS

| | | | |
|---|---|---|---|
| 2006/0089857 A1* | 4/2006 | Zimmerman et al. ............ 705/2 |
| 2006/0253445 A1* | 11/2006 | Huang et al. ..................... 707/9 |
| 2007/0124601 A1* | 5/2007 | Singh ....................... G06F 21/31 |
| | | | 713/189 |
| 2008/0163382 A1* | 7/2008 | Blue et al. ...................... 726/28 |
| 2008/0215622 A1* | 9/2008 | Jordan .............. G06F 17/30306 |
| 2009/0019553 A1 | 1/2009 | Narayanaswami |
| 2009/0055889 A1* | 2/2009 | Carlson ............... G06F 21/6218 |
| | | | 726/1 |
| 2009/0299994 A1* | 12/2009 | Krishnamurthy et al. ....... 707/5 |
| 2010/0088305 A1* | 4/2010 | Fournier ....................... 707/706 |
| 2010/0131551 A1* | 5/2010 | Benzaken .......... G06F 21/6245 |
| | | | 707/769 |
| 2010/0162355 A1* | 6/2010 | Zimmerman et al. ............ 726/2 |
| 2010/0250514 A1* | 9/2010 | Palmer .......................... 707/706 |
| 2011/0055922 A1* | 3/2011 | Cohen et al. .................. 726/22 |
| 2012/0089860 A1* | 4/2012 | Zaifman ............. G06F 11/0709 |
| | | | 714/2 |
| 2012/0210388 A1* | 8/2012 | Kolishchak ....................... 726/1 |
| 2012/0226858 A1* | 9/2012 | Steitz ............... G06F 17/30221 |
| | | | 711/117 |
| 2012/0302558 A1* | 11/2012 | Badiger ............... C07D 413/12 |
| | | | 514/228.8 |
| 2012/0303558 A1* | 11/2012 | Jaiswal .......................... 706/12 |
| 2012/0317410 A1* | 12/2012 | Paulsen ........................ 713/153 |
| 2013/0262080 A1* | 10/2013 | Marciano et al. ................ 704/3 |
| 2013/0266127 A1* | 10/2013 | Schachter et al. ......... 379/88.01 |
| 2013/0298254 A1* | 11/2013 | Hall et al. ....................... 726/26 |

OTHER PUBLICATIONS

IBM, "Method for secure servers to visually indicate potential confidential conflicts," IPCOM000189313D, Nov. 4, 2009.

IBM, "Method for enforcing authentication strength in a tagging system," IPCOM000191034D, Dec. 14, 2009.

Heath, "Managing the e-Discovery Process with Leaner Legal Teams from Review to Redaction," available at http://www.infograph.com/sites/default/files/LeaneDiscovery.pdf, 2012 (publication date unknown).

Cumby, et al, "A Machine Learning Based System for Semi-Automatically Redacting Documents," Proceedings of the Twenty-Third Innovative Applications of Artificial Intelligence Conference, 2011.

* cited by examiner

Customer A submits debug information to company F that includes the error message: "WASERR002E Cannot write to opt/websphere/appserver/config.xml, insufficient permissions for user johndoe@us.ibm.com".

Customer B submits debug information to company F that includes the error message: "WASERR002E Cannot write to opt/websphere/appserver/config.xml, insufficient permissions for user db2admin".

Customer C submits debug information to company F that includes the error message: "WASERR002E Cannot write to usr/test/bluezone/config.xml, insufficient permissions for user db2admin".

Customer D submits debug information to company F that includes the error message: "WASERR002E Cannot write to opt/websphere/appserver/config.xml, insufficient permissions for user db2admin".

Customer E submits debug information to company F that includes the error message: "WASERR002E Cannot write to opt/websphere/appserver/config.xml, insufficient permissions for user db2admin".

FIG. 5

WASERR002E Cannot write to opt/websphere/appserver/config.xml, insufficient permissions for user johndoe@us.ibm.com

FIG. 6

Problem
WASERR002E Cannot write to opt/websphere/appserver/config.xml, insufficient permissions for user db2admin
Exception stack generated
Solution
Set permission for file opt/websphere/appserver/config.xml to 777.

FIG. 7 user = jerryadmin5718
password = y7#ksN
Getting address from 127.0.0.1
Connecting to 163.74.5.34... Error! NullPointerException

FIG. 8

The term "user" appears in 83 of company A's documents, 150 of B's, and 344 of C's.
The term "jerryadmin5718" appears in 62 of company A's documents, 0 of B's, and 0 of C's.
The term "password" appears in 76 company A's documents, 111 of B's, and 305 of C's.
The term "y7#ksN" appears in 8 of company A's documents, 0 of B's, and 0 of C's.
The term "127.0.0.1" appears in 34 of company A's documents, 53 of B's, and 162 of C's.
The term "163.74.34" appears in 14 of company A's documents, 0 of B's, and 0 of C's.
The term "NullPointerException" appears in 21 of company A's documents, 68 of B's, and 90 of C's.

FIG. 9 user = jerryadmin5718
password = y7#ksN
Getting address from 127.0.0.1
Connecting to 163.74.5.34 ... Error! NullPointerException

FIG. 10

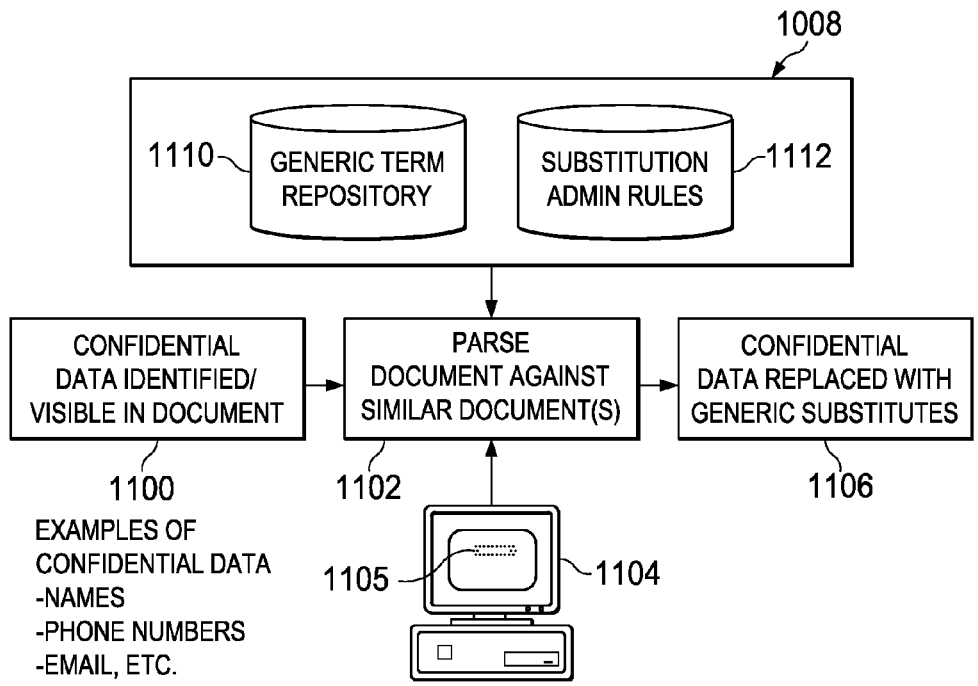

FIG. 11

IDENTIFYING CONFIDENTIAL DATA IN A DATA ITEM BY COMPARING THE DATA ITEM TO SIMILAR DATA ITEMS FROM ALTERNATIVE SOURCES

BACKGROUND OF THE INVENTION

1. Technical Field

This disclosure relates generally to protection against unintentional disclosure of confidential information in a computing environment.

2. Background of the Related Art

The types of sensitive information that arise in a typical enterprise environment may be quite varied. Such information includes, without limitation, intellectual property (e.g., code, designs, documentation, other proprietary information), identity information (e.g., personally identifiable information (PII)), credit card information (such as PCI-related data), health care information (such as HIPAA-related data), finance information (such as GLBA-related data), and the like. Often, it is desired to maintain some or all of that information as "confidential"—i.e., known only within the enterprise, or to certain permitted individuals or systems within the enterprise.

A problem arises, however, when referencing a document that contains both confidential information and non-confidential information, especially when that document may need to live (in whole or in part) external to the enterprise (or to a particular system thereof). Consider, for example, a customer filing a problem management record (PMR) with an external support provider. That problem record, which may have been generated in an automated manner, may include both confidential information, as well as information about the problem. The non-confidential information, if it could be extracted, may have independent value (e.g., if published in a support note). In such case, however, it would be necessary to remove or redact the confidential information. Removing or redacting the confidential information manually, naturally, is prone to errors of identification and unintentional omission. Publication of even a seemingly innocuous piece of information can create a significant legal or financial liability.

Existing confidential data detection solutions often rely on various strategies to prevent confidential information from being disclosed inadvertently. In one approach, a list of confidential items or terms is used; a document is compared against this list to identify portions that might require omission or redaction. Assembling and maintaining such a list, however, are non-trivial tasks. Another approach is to run the document against a simple tool, such as a spell-checker to allow irregularities to be exposed (and which then might be acted upon proactively). This approach, however, produces a large number of both false positives and false negatives. Yet another approach involves data string matching, e.g., searching for and removing terms matching a particular format (e.g., (###) ###-####), but this approach is narrow in scope. Other known approaches involve machine learning systems, pattern matching, and the like.

There remains a need in the art to provide for enhanced techniques to identify and distinguish confidential and non-confidential information from within a document (or, more generally, a data item) so that the confidential information may remain protected against inappropriate disclosure.

BRIEF SUMMARY OF THE INVENTION

The technique herein take advantage of a characteristic of confidential information, namely, that it is unlikely to be found outside of (i.e., external to) an organization that owns or controls (or at least desires to protect) that confidential information. As such, when it is desired to examine a given "data item" (e.g., a document) for inclusion of confidential information, the data item is compared against data items having similar structure and content from one or more other sources. In the example scenario of a data item being a problem record, a particular PMR (the one being examined for potential confidential information) from a customer is compared to other PMRs from one or more other customer(s) distinct from the customer. By comparing data items (of similar structure and content) from different sources, confidential information is then made to stand out by searching for terms (from the sources) that are not shared between or among the data items. In contrast, common words or terms that are shared across the sources are ignored as likely being non-confidential information; what remains as not shared may then be classified as confidential information and protected accordingly (e.g., by omission, redaction, substitution, or the like). Using this technique, non-confidential information may be safely segmented from confidential information, preferably in a dynamic, automated manner.

In one embodiment, a method of identifying confidential information in a data item (e.g., a document, a report, a file, a log, an email, a message, or other communication) is described. The data item is associated with a source, such as a customer. The method begins by receiving or obtaining, from each of a set of alternative sources, a data item of a same type and format as the data item. The data item (being examined for confidential information) is then compared to each of the data item(s) obtained from the set of alternative sources to identify occurrences of particular pieces of information in the data item. Based on the occurrences of particular pieces of information in the data item and a given sensitivity criteria, one or more pieces of information in the data item are then segmented as representing potential confidential information. These one or more pieces of information may then be highlighted (e.g., in a visual representation of the data item) so that a user viewing the data item may take a given action (e.g., removal, redaction, substitution, or the like) with respect to a particular piece of information. The resulting data item, with the particular piece(s) of information representing confidential information no longer present, also may be used for other purposes (e.g., auditing, logging, reporting, publication, or the like).

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 5 illustrates a first use case scenario illustrating a set of debug error messages generated by several different customers and received by a support company;

FIG. 6 illustrates a first customer's error message annotated with a highlight to identify potential confidential information that has been identified by the technique of this disclosure;

FIG. 7 illustrates a tech note that the support company has created in the first use case scenario after substituting non-confidential information for the confidential information located by the method;

FIG. 8 illustrates an error message from a customer in a second use case scenario;

FIG. 9 illustrates frequency of occurrence data generated as a result of analyzing similar error messages received from the alternative sources in the second use case scenario;

FIG. 10 illustrates the error message of FIG. 8 annotated to show potential pieces of information that may be confidential information; and FIG. 11 illustrates a representative data processing system and workflow that implements the described method.

DETAILED DESCRIPTION OF AN ILLUSTRATIVE EMBODIMENT

Figure 1:
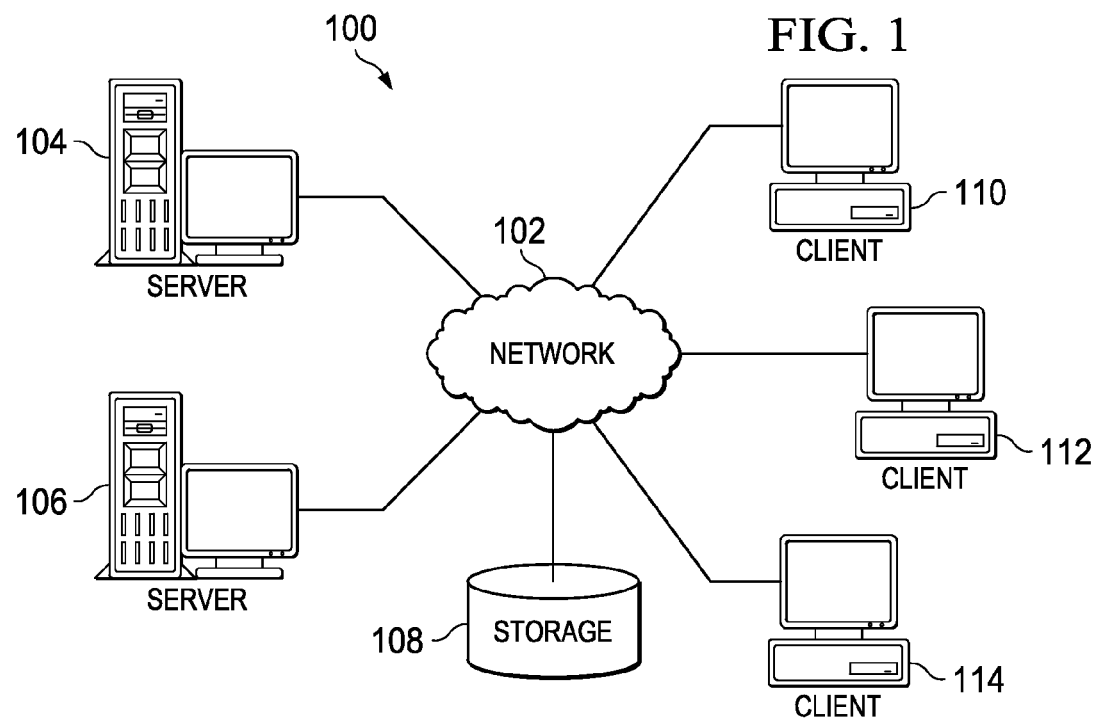
FIG. 1 depicts an exemplary block diagram of a distributed data processing environment in which exemplary aspects of the illustrative embodiments may be implemented.
Figure 2:
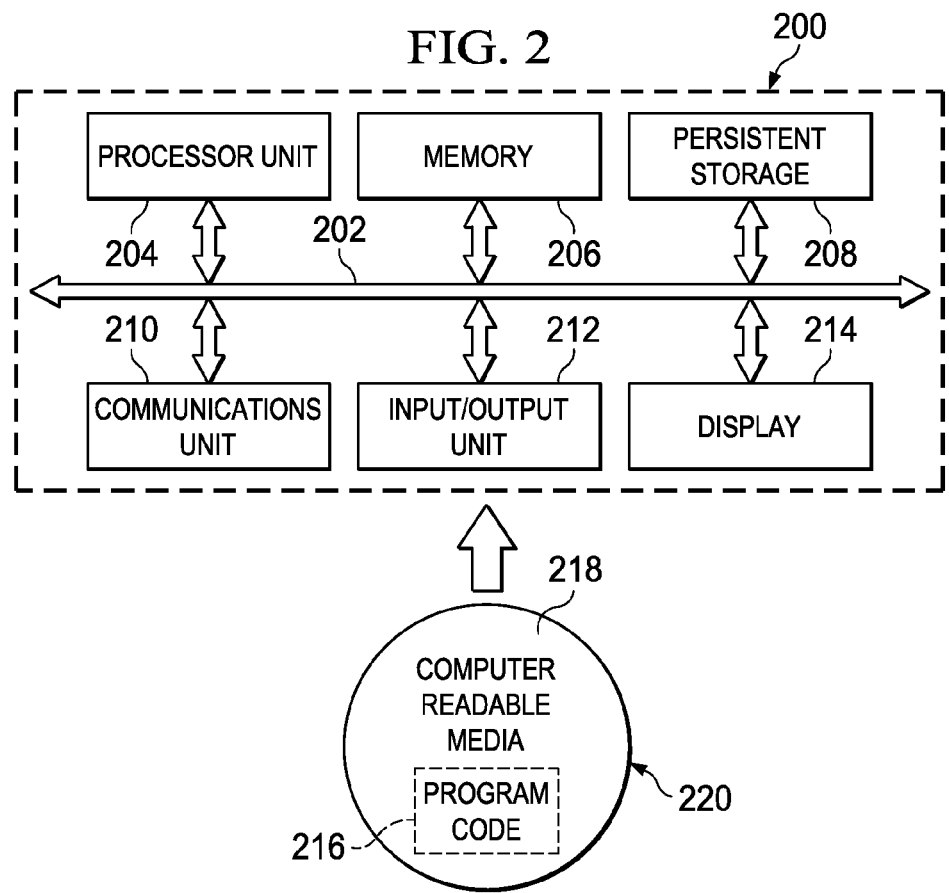
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 3:
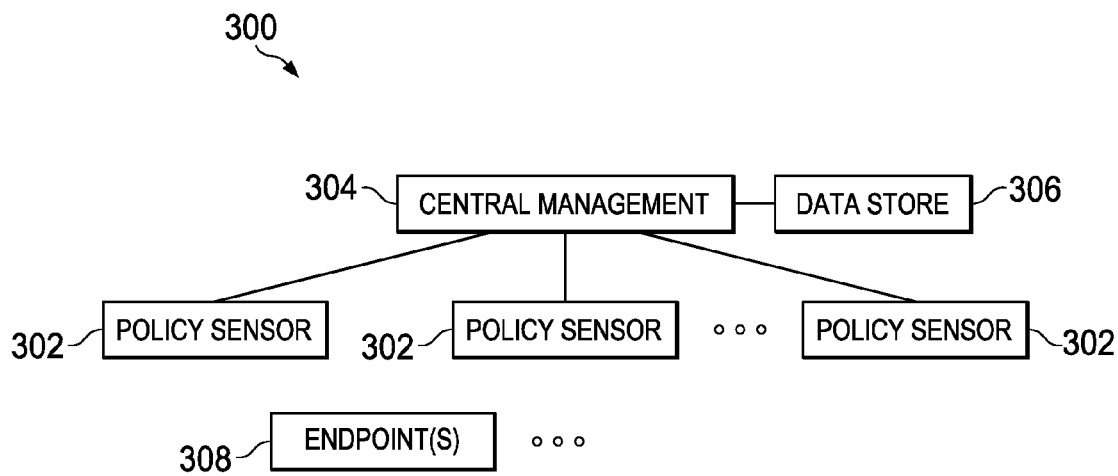
FIG. 3 illustrates a known data loss prevention (DLP) solution in which the subject matter of this disclosure may be implemented.

Although not meant to be limiting, and as described below, a representative data processing system in which the techniques of this disclosure are implemented is an appliance-based data loss prevention (DLP) solution. DLP systems are well-known and work to reduce the risk of sensitive data loss, primarily at the network layer. As seen in FIG. 3, a representative DLP solution 300 comprises a set of distributed components, typically arranged in a tiered architecture. Multiple policy sensors 302 are placed around the network (typically as rack-based appliances, software applications, or the like) and are designed to detect and/or prevent data loss. Generally, in an appliance-based implementation, an appliance may comprise a data processing system such as described in FIG. 2. The appliance includes a policy engine that works generally by capturing packets from the network, reassembling the packets into sessions, analyzing the information flow, extracting content for analysis, and performing content analysis to identify sensitive information. The appliance may use system-defined or user-defined policies, where a policy represents a group of one or more rules. A rule typically is a logical combination of one or more triggers that are content-based, location-based and/or flow-based. Sessions with policy violations are detected by the sensors and forwarded a central management console 304 that distributes policies and collects and organizes alerts. A data store 306 is used to store data and policies, typically in a database. The central management console 304 includes a web-based graphical user interface (GUI) for management, administration and reporting. As used herein, the type of sensitive information protected by such a DLP solution may be quite varied. Typically, such information includes, without limitation, intellectual property (e.g., code, designs, documentation, other proprietary information), identity information (e.g., personally identifiable information (PII)), credit card information (such as PCI-related data), health care information (such as HIPAA-related data), finance information (such as GLBA-related data), and the like. As also seen in FIG. 3, the DLP solution is implemented across one or more endpoints 308. Without limitation, endpoints may be end user desktops, workstations or laptops, or servers.

Preferably, a policy is created and managed in the central management console (such as shown in FIG. 3).

Thus, in general a DLP system provides a policy-based mechanism for managing how data is discovered and classified on an endpoint workstation, file server or other device within an enterprise. An endpoint is a data processing system (such as described above in FIG. 2) and that has an associated file system (or equivalent data store). The endpoint may execute DLP software. An endpoint typically includes a DLP application that executes as software, i.e., as a set of program instructions, executed from computer memory by a processor. The DLP application is configurable according to a policy, where the policy is created and managed in a central management console (such as shown in FIG. 3). This is not a limitation, however, as a particular DLP policy may be implemented locally (at the endpoint itself).

The techniques below are not limited to being implemented in, or in association with, DLP architecture. Indeed, as will be seen, the technique may be implemented in association with any generic application program including, without limitation, document management systems, word processing programs, e-mail or other generic messaging programs, problem report management systems, and many more.

Dynamic Segmentation of Non-Confidential Information from a Set of Confidential Data With the above as background, the techniques of this disclosure are now described.

As described above, the techniques herein provide an automated technique to identify (and thereby) separate out confidential information from non-confidential information in a particular data item. For convenience of description and illustration only, the technique will be described in the context of a common use scenario wherein the data item is a problem report, but this is not a limitation. According to this use case, it is assumed that clients of a Company submit data items (such as log, trace and other files) to receive technical support for software and hardware products. When the problems are solved, Company support staff often desire to create technical ("tech") notes using some of the information received from the clients; these tech notes often include examples, such as the data items initially received, and they are often published to the web (or elsewhere) so that others (having similar issues) can search and solve their problems. Frequently, however, the data item that is copied into the tech note contains confidential information that was never intended to be published. That information may be personally identifiable information (PII) or other highly sensitive data, the disclosure of which should be prevented.

To that end, a method of identifying confidential information in a data item (e.g., a document, a report, a file, a log, an email, a message, or other communication) is described herein. The data item is associated with a data source, such as a customer.

Figure 4:
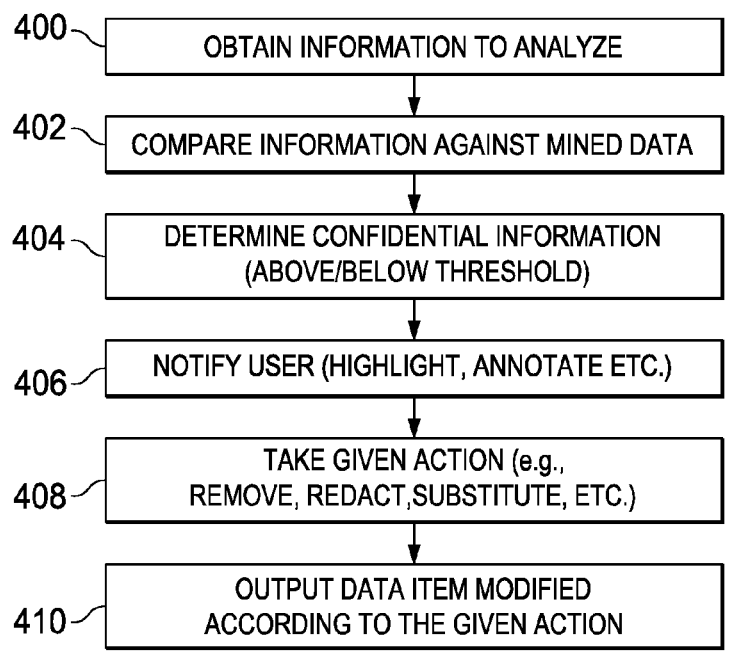
FIG. 4 illustrates a process flow illustrating a method to dynamically segment non-confidential information a set of confidential data according to this disclosure.

As seen in FIG. 4, the method begins at step 400 by receiving or obtaining, from each of a set of alternative sources, a data item of a same type and format as the data item. Step 400 may be performed actively (e.g., via a data mining tool), or passively (e.g., by simply receiving the data items from the alternative sources). At step 402, the data item (being examined for confidential information) is then compared to each of the data item(s) obtained from the set of alternative sources to identify occurrences of particular pieces of information in the data item. Preferably, the comparison is performed on a data item-by-data item basis (i.e., comparing each data item received from an alternative source to the source data item of interest); the comparisons may be performed sequentially or concurrently, depending on the comparator tool. Based on the occurrences of particular pieces of information in the data item and a given sensitivity criteria, one or more pieces of information in the data item are then identified. This is step 404. At step 406, a user is notified that the one or more pieces of information in the data item are (or may be) confidential information. In one embodiment, these one or more pieces of information are highlighted (e.g., in a visual representation of the data item) so that a user viewing the data item may take a given action (e.g., removal, redaction, substitution, or the like) with respect to a particular piece of information. At step 408, the given action is taken, and this action may be carried out manually, in an automated manner, or programmatically. The resulting data item, with the particular piece(s) of information representing confidential information no longer present, is the output from the system. This is step 410. Thus, in step 410, the resulting data item (without the confidential information) is used for some other purpose (e.g., auditing, logging, reporting, or the like). A representative report in the PMR context would be a tech note published on the web.

The manner in which comparison step 402 is carried out will depend on the type of data item and its structure. The structure and contents of the data item to be examined for confidential information is assumed to be known (or ascertainable) by the system. Thus, if the data item is a problem report record, the system knows (or can determine) that the first, say, 6 characters of the record are a timestamp, the next, say, 10 characters of the record represent the problem, and so forth. Using this knowledge of the data item type/format, the system can then compare data items that share the same type/format for the existence of the pieces of information that may represent confidential information.

As step 402 is carried out, the system in effect maintains an array comprises a piece of information (or some unique identifier associated therewith) together with a simple count of the number of occurrences of that piece of information in the data items available from the alternative sources. This comparison information may be considered a "histogram." Although not meant to be limiting, preferably the existence of a piece of information being compared is counted only once, irrespective of the number of times it might be used in a particular data item. This is because step 408 (the given action that, for example, removes, redacts or substitutes the piece of information) preferably is applied to all instance(s) of the data item. In other words, the step of identifying occurrences of particular pieces of information in the data item preferably treats multiple occurrences of the piece of information within a data item from an alternative source as a single occurrence. If an alternative source provides multiple data items for comparison, the step of identifying occurrences of the piece of information within the multiple data items generates a value that, for that alternative source, indicates the total number of the data items that include the piece of information (counting multiple occurrences in any particular data item from that source as just one occurrence, as noted above).

The given sensitivity criteria by which a determination is made in step 402 (that a particular piece of information) should be classified as potential confidential information is a configurable threshold. Thus, if the particular piece of information is found to exist in the data items from more than the configurable threshold (e.g., 10%, 20%, or the like) of alternative sources (taken into consideration multiple data items from a particular source, as described above), then it is considered to be confidential information and the given action taken. A configurator tool may be used to set the configurable threshold, or the threshold may be set to certain static (default) values for given types of data items. A particular threshold may be higher or lower depending on the nature of the data item, given that certain types of data items may be more or less likely to include confidential information under a given operating condition or scenario. In an alternative embodiment, the sensitivity threshold may not be applied, in which case any piece of information that is not found in all of the data items received from the alternative sources is deemed to be potential confidential information and then brought to the user's attention (e.g., by being highlighted in a visual display of the data item).

The following describes several representative use cases to illustrate the above-described technique. These examples are merely for exemplary purposes, and they should not be construed to limit the described subject matter, which as noted above is applicable to any data item, irrespective of its source, format, or data contents.

In a first scenario, assume customers A, B, C, D and E submit documents potentially containing confidential information to company F, which provides technical support for the product or service in question. FIG. 5 illustrates the debug information (the error messages) submitted by each of the customers. Now, because the problem is not an isolated incident, assume that company F desires to release a tech note summarizing the problem. If Company F decides to use customer A's error message as an example, it may then use the techniques of the disclosure to ensure that A's error message is only used after identifying any potential confidential information in that error message. Because Company F does not necessarily have any pre-existing (or a priori) knowledge of what piece(s) of information in that error message might be considered confidential (to customer A), it execute the method described above in FIG. 4. In particular, customer A's error message is opened in a tool (e.g., an editor) that performs the necessary comparisons and, given a configurable sensitivity of, say, <20%, automatically highlights just one term (johndoe@us.ibm.com), which appeared in 0% of the error messages received from the alternative sources (B, C, D and E). Other words, terms, or phrases, such as "WASERR002E" (which appeared in 100% of the other messages), "Cannot" (which appeared in 100% of the other messages) and "opt/websphere/appserver/config.xml" (which appeared in 75% of the other messages), are not highlighted. FIG. 6 illustrates the display of customer A's error message with the suspect portion (the potential confidential information) highlighted to the user. Any particular type of highlight (or, more generally, an annotation) may be used, depending on the editor tool, the nature and type of the display interface, and the like. More generally, any type of notification may be provided to the user, including a notification that is other than a visual representation. Based on the notification, the user can then take the given action, which, in this case, is a substitution of the generic "db2admin" data that was found to exist in 80% of the other error messages (above the configurable threshold). The user can then issue the tech note that includes the problem solution, such as shown in FIG. 7.

In a second use case scenario, the companies submit multiple instances of the documents in question. Thus, assume customers A, B and C submit documents to company F in the following numbers: customer A (100 documents), customer B (200 documents) and customer C (400 documents). One of the documents submitted by customer A is shown in FIG. 8, and Company F decides to use this document as a template for a potential tech note. As described above, because the document originated from customer A, preferably the data item comparisons are carried out only from the error messages received from customers B and C (in this example, the alternative sources). After analyzing the data items, the tool generates the frequency data summarized in FIG. 9. As can be seen, "user" appears in 82% ([150+344]/600) of the documents from customers B and C, the term "jerryadmin5718" appears in 0% of the documents, the term "password" appears in 69% ([111+305]/600) of the documents, the term "y7#ksN" appears in 0% of the documents, the IP address "127.0.0.1" appears in 36% ([52+162]/600) of the documents, the IP address "163.74.5.34" appears in 0% of the documents, and the phrase "NullPointerException" appears in 26% ([68+90]/600) of the documents. Given the <20% sensitivity threshold, the original error message selected for evaluation is then annotated as shown in FIG. 10. As can be seen, the terms "user," "password," "127.0.0.1" and "NullPointerException" are all common in the IT domain of interest (as reflected in the error messages examined), even though they may pieces of information that have not been previously collected or seen by the system. In contrast, the terms "jerryadmi5718," "y7#ksN" and "163.74.5.34" are terms that appear only with customer A's message and thus are likely confidential. They are highlighted so that the user can take the given action necessary or desirable to ensure that re-use of this particular message does not expose these pieces of information.

FIG. 11 illustrates a potential system and workflow for the techniques described herein. As noted above, the method may be implemented in any type of system, device, application program, or process. In this system, document 1100 includes confidential data. The document is processed by a comparator tool 1102 in the manner described above. Based on the comparisons of the document against similar documents (not shown) received from the alternative sources, an editor is opened in the display interface 1104 and the document as annotated 1105 is displayed to the user. In this example, the confidential data is replaced with generic data. To this end, the user then enters appropriate commands to identify a generic term that may be substituted in place of any confidential data identified by the tool 1102. The generic terms may be stored in a repository 1110. In one embodiment, a set of substitution rules 1112 may be stored and used programmatically to make the desired substitution(s).

Repository 1110 and rules 1112 comprise a database 1108. Depending on the configuration, the generic data may be substituted manually (e.g., by user entry of commands), or automatically, based on one or more substitution rules. The resulting document (with the confidential data replaced by the generic substitutes) 1106 is then output. In this example, the comparator tool 1102 may be implemented as software that executes in the data processing system that includes the display interface 1104. In one implementation, the display interface 1104 is a web-based editor. The editor includes a configuration panel to enable a user to identify and determine the sensitivity criteria, to identify actions (e.g., removal, redaction, substitution, etc.), and the like, as well as a display panel, e.g., to display the original document 1100, the document as annotated to reflect the potential confidential data, and the "cleaned" document 1106. The display tool configurator may be implemented in the central management console in FIG. 3 or, more generally, in any data processing system such as shown in FIG. 2.

More generally, any of the above-identified functions may be co-located or implemented remote from one another.

The method, in whole or in part, may be implemented in a software-as-a-service (SaaS) model.

The subject matter described herein has many advantages. The technique enables a system or user to determine confidential data in a data item without preexisting knowledge of particular pieces of information that may be considered (by the source of the data item) to be confidential. The approach is simple to implement, especially as compared to complex machine-learning or other automated tools of the prior art, which provide less than satisfactory results for the reasons previously explained. The technique takes advantage of the unique characteristic of confidential information, namely, that it is unlikely to appear outside of an organization owning that information.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, one or more of the method steps shown in FIG. 4 are implemented in a special purpose computer, preferably in software executed by one or more processors. The software is maintained in one or more data stores or memories associated with the one or more processors, and the software may be implemented as one or more computer programs. Collectively, this special-purpose hardware and software comprises or supplements any existing data processing system or application, as has been described While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Any application or functionality described herein may be implemented as native code, by providing hooks into another application, by facilitating use of the mechanism as a plug-in, by linking to the mechanism, and the like.

The alternative sources may be web-based (or the like) sources that are mined using conventional search engine tools.

Having described our invention, what we now claim is as follows:

1. A method of identifying potential confidential information in a data item, the data item associated with a source, comprising:

obtaining, from each of a set of alternative sources, a data item of a same type and format as the data item;

comparing, using a hardware element, the data item to the data item(s) obtained from the set of alternative sources to identify occurrences of particular pieces of information in the data item, wherein multiple occurrences of a particular piece of information within a data item from each alternative source are treated as a single occurrence; and based on the occurrences of particular pieces of information in the data item and a given sensitivity criteria, and without knowledge that the particular pieces of information are considered by the source to be confidential, segmenting one or more pieces of information in the data item as representing the potential confidential information.

2. The method as described in claim 1 further including highlighting the one or more pieces of information.

3. The method as described in claim 2 further including taking a given action with respect to the one or more pieces of information that have been highlighted.

4. The method as described in claim 3 wherein the given action is one of: removing the piece of information, redacting the piece of information, and substituting non-confidential data for the piece of information.

5. The method as described in claim 3 further including outputting the data item without the one or more pieces of information.

6. The method as described in claim 1 wherein the data item is one of: a document, a report, a file, a log, a message, an email, and a communication.

7. The method as described in claim 1 wherein the given sensitivity criteria is a configurable threshold.

8. Apparatus, comprising:

a processor;

computer memory holding computer program instructions that when executed by the processor perform a method of identifying potential confidential information in a data item, the data item associated with a source, the method comprising:

obtaining, from each of a set of alternative sources, a data item of a same type and format as the data item;

comparing the data item to the data item(s) obtained from the set of alternative sources to identify occurrences of particular pieces of information in the data item, wherein multiple occurrences of a particular piece of information within a data item from each alternative source are treated as a single occurrence; and based on the occurrences of particular pieces of information in the data item and a given sensitivity criteria, and without knowledge that the particular pieces of information are considered by the source to be confidential, segmenting one or more pieces of information in the data item as representing the potential confidential information.

9. The apparatus as described in claim 8 wherein the method further includes highlighting the one or more pieces of information.

10. The apparatus as described in claim 9 wherein the method further includes taking a given action with respect to the one or more pieces of information that have been highlighted.

11. The apparatus as described in claim 10 wherein the given action is one of: removing the piece of information, redacting the piece of information, and substituting non-confidential data for the piece of information.

12. The apparatus as described in claim 10 wherein the method further includes outputting the data item without the one or more pieces of information.

13. The apparatus as described in claim 8 wherein the data item is one of: a document, a report, a file, a log, a message, an email, and a communication.

14. The apparatus as described in claim 8 wherein the given sensitivity criteria is a configurable threshold.

15. A computer program product in a non-transitory computer-readable storage medium in a data processing system, the computer program product holding computer program instructions which, when executed by the data processing system, perform a method of identifying potential confidential information in a data item, the data item associated with a source, the method comprising:

obtaining, from each of a set of alternative sources, a data item of a same type and format as the data item;

comparing the data item to the data item(s) obtained from the set of alternative sources to identify occurrences of particular pieces of information in the data item, wherein multiple occurrences of a particular piece of information within a data item from each alternative source are treated as a single occurrence; and based on the occurrences of particular pieces of information in the data item and a given sensitivity criteria, and without knowledge that the particular pieces of information are considered by the source to be confidential, segmenting one or more pieces of information in the data item as representing the potential confidential information.

16. The computer program product as described in claim 15 wherein the method further includes highlighting the one or more pieces of information.

17. The computer program product as described in claim 16 wherein the method further includes taking a given action with respect to the one or more pieces of information that have been highlighted.

18. The computer program product as described in claim 17 wherein the given action is one of: removing the piece of information, redacting the piece of information, and substituting non-confidential data for the piece of information.

19. The computer program product as described in claim 17 wherein the method further includes outputting the data item without the one or more pieces of information.

20. The computer program product as described in claim 15 wherein the data item is one of: a document, a report, a file, a log, a message, an email, and a communication.

21. The computer program product as described in claim 15 wherein the given sensitivity criteria is a configurable threshold.

22. Apparatus, comprising:

a display interface;

a processor;

computer memory holding computer program instructions executed by the processor to identify potential confidential information in a data item, the data item associated with a source, by (i) comparing the data item to data items of a similar type and format received from a set of alternative sources to identify occurrences of particular pieces of information in the data item, and (ii) based on the occurrences of particular pieces of information in the data item, and without knowledge that the particular pieces of information are considered by the source to be confidential, identifying one or more pieces of information in the data item as representing the potential confidential information, wherein multiple occurrences of a particular piece of information within a data item from at least one particular alternative source are treated as a single occurrence, and (iii) outputting, on the display interface, a representation of the data item with the one or more pieces of information representing potential confidential information highlighted.

\* \* \* \* \*